(12) United States Patent
Chin

(10) Patent No.: US 11,035,634 B2
(45) Date of Patent: *Jun. 15, 2021

(54) FIREARM END PLATE AND ANTI-LOOSE CASTLE NUT

(71) Applicant: Strike Industries, Inc., Santa Ana, CA (US)

(72) Inventor: David Hyung Chin, Irvine, CA (US)

(73) Assignee: Strike Industries, Inc., Santa Ana, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/988,357

(22) Filed: Aug. 7, 2020

(65) Prior Publication Data

US 2021/0108871 A1    Apr. 15, 2021

Related U.S. Application Data

(63) Continuation-in-part of application No. 16/256,786, filed on Jan. 24, 2019, now Pat. No. 10,794,645, which is a continuation-in-part of application No. 29/657,322, filed on Jul. 20, 2018, now abandoned, which is a continuation-in-part of application No. 29/657,389, filed on Jul. 20, 2018, now Pat. No. Des. 905,812, which is a continuation-in-part of application No. 29/657,391, filed on Jul. 20, 2018, now abandoned.

(51) Int. Cl.
| | |
|---|---|
| *F41C 23/20* | (2006.01) |
| *F41A 3/84* | (2006.01) |
| *F41A 11/02* | (2006.01) |
| *F41A 3/66* | (2006.01) |

(52) U.S. Cl.
CPC ............... *F41A 3/66* (2013.01); *F41A 3/84* (2013.01); *F41C 23/20* (2013.01); *F41A 11/02* (2013.01)

(58) Field of Classification Search
CPC ...... F41A 3/82; F41A 3/80; F41A 3/78; F41A 11/00; F41A 11/02; F41C 23/20
USPC .............................................. 42/75.01, 75.03
See application file for complete search history.

(56) References Cited

U.S. PATENT DOCUMENTS

| | | | | |
|---|---|---|---|---|
| 6,470,616 B1 * | 10/2002 | Clay | ...................... | F41A 11/00 42/75.01 |
| 6,671,990 B1 * | 1/2004 | Booth | ..................... | F41C 23/16 42/75.01 |
| 7,162,823 B2 * | 1/2007 | Schoppman | ............ | F41A 11/04 42/75.01 |

(Continued)

*Primary Examiner* — Derrick R Morgan
(74) *Attorney, Agent, or Firm* — Andy M. Han; Han IP PLLC

(57) ABSTRACT

A castle nut has a groove around an exterior circumference thereof. An end plate has a through hole extending in a direction perpendicular to a longitudinal axis of a firearm. When a buffer tube is threaded onto a lower receiver of the firearm with the buffer tube traversing through the castle nut and the end plate, the castle nut can be screwed in a direction toward the lower receiver to fasten the end plate against the lower receiver. When the end plate is fastened against the lower receiver by the castle nut, the securing device can be screwed into the through hole of the end plate such that a portion of the securing device is engaged with the groove of the castle nut to prevent the castle nut to be loosened by being unscrewed in a direction away from the lower receiver.

18 Claims, 4 Drawing Sheets

(56) References Cited

U.S. PATENT DOCUMENTS

| | | | | |
|---|---|---|---|---|
| 7,398,616 B1* | 7/2008 | Weir | F41C 23/04 | 42/71.01 |
| 8,904,691 B1* | 12/2014 | Kincel | F41C 23/16 | 42/71.01 |
| 8,910,408 B2* | 12/2014 | Masters | F41A 21/484 | 42/75.02 |
| 8,991,088 B1* | 3/2015 | Young | F41A 25/00 | 42/75.03 |
| 9,528,793 B1* | 12/2016 | Oglesby | F41C 23/00 | |
| 9,927,192 B1* | 3/2018 | Sylvester | F41A 3/78 | |
| 10,260,837 B1* | 4/2019 | McGinty | F41C 23/14 | |
| 10,648,768 B1* | 5/2020 | Oglesby | F41C 23/16 | |
| 10,704,848 B1* | 7/2020 | Zeider | F41A 3/84 | |
| 2010/0287808 A1* | 11/2010 | King | F41C 23/02 | 42/85 |
| 2011/0126443 A1* | 6/2011 | Sirois | F41G 11/003 | 42/90 |
| 2013/0212920 A1* | 8/2013 | Law | F41C 23/04 | 42/75.03 |
| 2014/0373419 A1* | 12/2014 | Leclair | F41C 23/16 | 42/71.01 |
| 2016/0054094 A1* | 2/2016 | Colt | F41G 1/01 | 42/75.03 |
| 2016/0209162 A1* | 7/2016 | Geissele | F41C 27/22 | |
| 2017/0059273 A1* | 3/2017 | Geissele | F41C 23/16 | |
| 2017/0160049 A1* | 6/2017 | Swineheart | F41C 23/06 | |
| 2017/0227312 A1* | 8/2017 | Christensen | F41A 9/66 | |
| 2018/0080733 A1* | 3/2018 | Battaglia | F41A 11/02 | |
| 2018/0306551 A1* | 10/2018 | Reid | F41A 3/66 | |
| 2019/0056188 A1* | 2/2019 | Miller | F41A 11/00 | |
| 2019/0170476 A1* | 6/2019 | Hiler, Jr. | F41C 23/16 | |
| 2019/0257601 A1* | 8/2019 | Brown | F41A 3/84 | |
| 2020/0182568 A1* | 6/2020 | Bergman | F41A 3/78 | |

* cited by examiner

STEP 1

FIG. 1

STEP 2

FIREARM END PLATE AND ANTI-LOOSE CASTLE NUT

CROSS REFERENCE TO RELATED PATENT APPLICATIONS

The present disclosure is part of a continuation-in-part (CIP) of U.S. patent application Ser. No. 16/256,786, filed on 24 Jan. 2019, which is a CIP of each of U.S. patent application Ser. Nos. 29/657,322, 29/657,389 and 29/657,391, all of which filed on 20 Jul. 2018. Contents of above-listed applications are herein incorporated by reference in their entirety.

TECHNICAL FIELD

The present disclosure is generally related to firearms and, more particularly, to a receiver end plate and an anti-loose castle nut of a firearm.

BACKGROUND

Unless otherwise indicated herein, approaches described in this section are not prior art to the claims listed below and are not admitted as prior art by inclusion in this section.

Generally, a castle nut (also known as a receiver extension nut) in a firearm based on the AR-15 or AR-10 platform is a circular and notched nut that screws onto a receiver extension (e.g., buffer tube) of a lower receiver of the firearm. The castle nut keeps the receiver extension and a lower receiver end plate secured in place. On a standard castle nut built according to the United States military standard (i.e., mil-spec), one side of the castle nut usually has large notches that resemble the crenellated parapet of a medieval castle. On the opposite side, there are typically smaller notches or indents facing the receiver end plate when correctly installed. These smaller notches are designed for staking purposes.

Traditionally, an anti-loose castle nut is created by staking the receiver end plate to the castle nut, but this tends to result in damages to the receiver end plate. Once removed, the process cannot be repeated and the damaged receiver end plate may not be re-usable.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In view of the aforementioned issue, an objective of the present disclosure is to provide an innovative design of a receiver end plate and an anti-loose castle nut so that the receiver end plate and castle nut can be repeatedly installed and removed multiple times. Advantageously, this can result in cost savings and reduction in wastefulness.

In one aspect, an apparatus implementable on a firearm may include a castle nut, a receiver end plate and a generally cylindrical-shaped securing device. The castle nut may have a groove around an exterior circumference of the castle nut. The receiver end plate may have a through hole extending in a direction perpendicular to a longitudinal axis and along a horizontal plane of the firearm. When a buffer tube is threaded onto a lower receiver of the firearm with the buffer tube traversing through the castle nut and the receiver end plate, the castle nut may be screwed in a direction toward the lower receiver to fasten the receiver end plate against the lower receiver. Moreover, when the receiver end plate is fastened against the lower receiver by the castle nut, the securing device may be screwed into the through hole of the receiver end plate such that a portion of the securing device is engaged with or otherwise horizontally received in the groove of the castle nut to prevent the castle nut to be loosened by being unscrewed in a direction away from the lower receiver.

In one aspect, an apparatus implementable on a firearm may include a castle nut and a receiver end plate. When a buffer tube is threaded onto a lower receiver of the firearm with the buffer tube traversing through the castle nut and the receiver end plate, the castle nut may be screwed in a direction toward the lower receiver to fasten the receiver end plate against the lower receiver. Additionally, when the receiver end plate is fastened against the lower receiver by the castle nut, the groove of the castle nut may be aligned with the through hole of the receiver end plate.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, explain the principles of the disclosure. It is appreciable that the drawings are not necessarily in scale as some components may be shown to be out of proportion than the size in actual implementation to clearly illustrate the concept of the present disclosure.

FIG. 1 is a diagram of a first step of an assembly process of an anti-loose castle nut and a receiver end plate to a lower receiver of a firearm in accordance with an implementation of the present disclosure.

DETAILED DESCRIPTION OF PREFERRED IMPLEMENTATIONS

Figure 2:
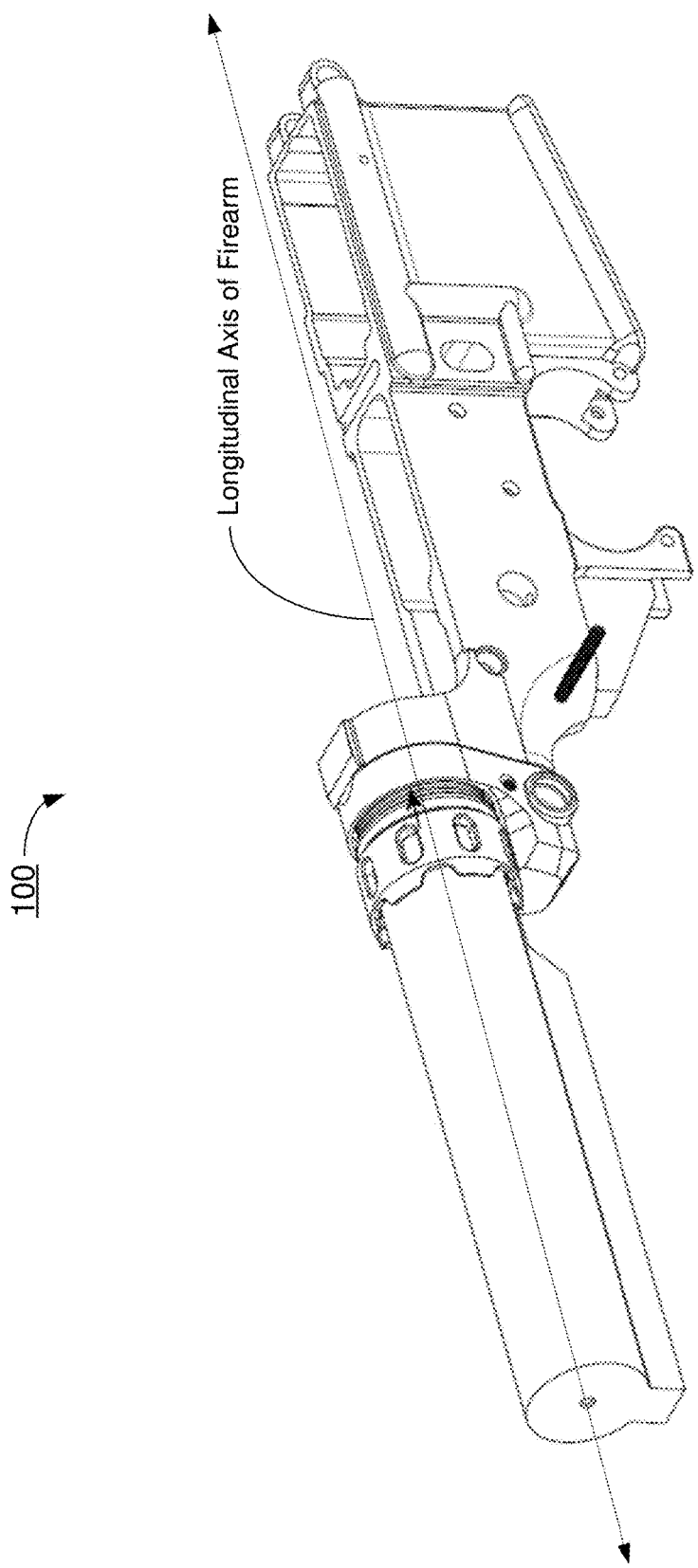
FIG. 2 is a diagram of a second step of an assembly process of an anti-loose castle nut and a receiver end plate to a lower receiver of a firearm in accordance with an implementation of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art.

In the description below, details of well-known features and techniques may be omitted to avoid unnecessarily obscuring the presented embodiments and implementations.

The position terms used in the present disclosure, such as "front", "forward", "rear", "back", "top", "bottom", "left", "right", "head", "tail" or the like assume a firearm in the normal firing position, with the firearm being in a position in which the longitudinal axis of the barrel of the firearm runs generally horizontally and the direction of firing points "forward" away from the operator or user of the firearm. The same convention applies for the direction statements used herein.

As used herein, the terms "proximal" and "proximally" may denote "forward" and "forwardly" with respect to the firearm, and the terms "distal" and "distally" may denote "rearward" and "rearwardly" with respect to the firearm. As used herein, the verb "to comprise" in this description, claims, and other conjugations are used in its non-limiting sense to mean those items following the word are included, but items not specifically mentioned are not excluded. As used herein, the word "forward" means moving in the direction that the projectile moves during firing a firearm. As used herein, the word "proximal" means closer to the reference point, in this case, the shooter. As used herein, the word "distal" means farther to the reference point, in this case, the shooter. Reference to an element by the indefinite article "a" or "an" does not exclude the possibility that more than one of the elements are present, unless the context clearly requires that there is one and only one of the elements. The indefinite article "a" or "an" thus usually means "at least one." Additionally, the words "a" and "an" when used in the present document in concert with the words "comprising" or "containing" denote "one or more.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure. The recitation of numerical ranges by endpoints includes all numbers within that range (e.g. 1 to 5 includes 1, 1.5, 2, 2.75, 3, 3.80, 4, and 5). All dimensions given herein are by way of examples to better illustrate the present disclosure embodiments and shall not be construed to limit the dimensions of the present disclosure embodiments to the given numeric values.

Overview

Figure 1:
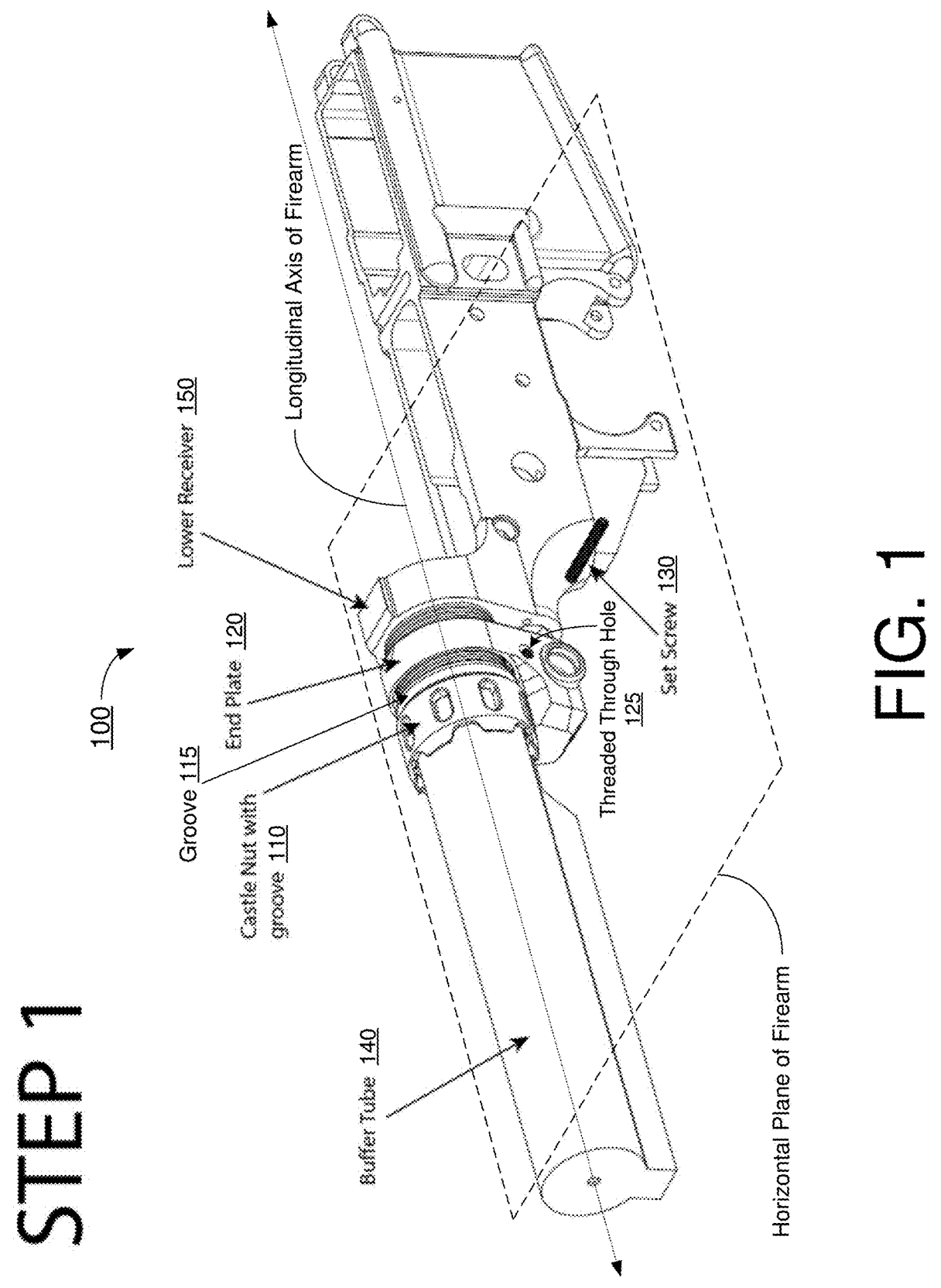

FIG. 1 illustrates a first step of an assembly process of an anti-loose castle nut 110 and a receiver end plate 120 to a lower receiver 150 of a firearm in accordance with an implementation of the present disclosure. Referring to FIG. 1, an apparatus 100 implementable on a firearm may include castle nut 110, receiver end plate 120, and a generally cylindrical-shaped securing device 130. Castle nut 110 may be configured with a groove 115 around an exterior circumference of castle nut 110. End plate receiver 120 may be configured with a through hole 125 that extends in a direction perpendicular to a longitudinal axis and along a horizontal plane of the firearm. In the first step of assembly process (denoted as "Step 1" in FIG. 1), castle nut 110 and receiver end plate 120 are assembled on a buffer tube 140 of the firearm, with buffer tube 140 threaded onto lower receiver 150 of the firearm. Securing device 130 may include, for example and without limitation, at least a set screw, pin screw, roll pin or dowel pin. In case that securing device 130 includes a set screw or roll pin, through hole 125 may be a threaded through hole into which the set screw can be screwed or the roll pin can be punched to provide securing function. In some implementations, securing device 130 may include one or more long set screws or one or more long roll pins. In other implementations, securing device 130 may include one or more shorter set screws or one or more shorter roll pins.

FIG. 2 illustrates a second step of the assembly process in accordance with an implementation of the present disclosure. In the second step of assembly process (denoted as "Step 2" in FIG. 2), after buffer tube 140 is completely threaded onto lower receiver 150, receiver end plate 120 is fastened or otherwise pressed against lower receiver 150 by castle nut 110 as castle nut 110 is screwed in a direction toward lower receiver 150.

Figure 3:
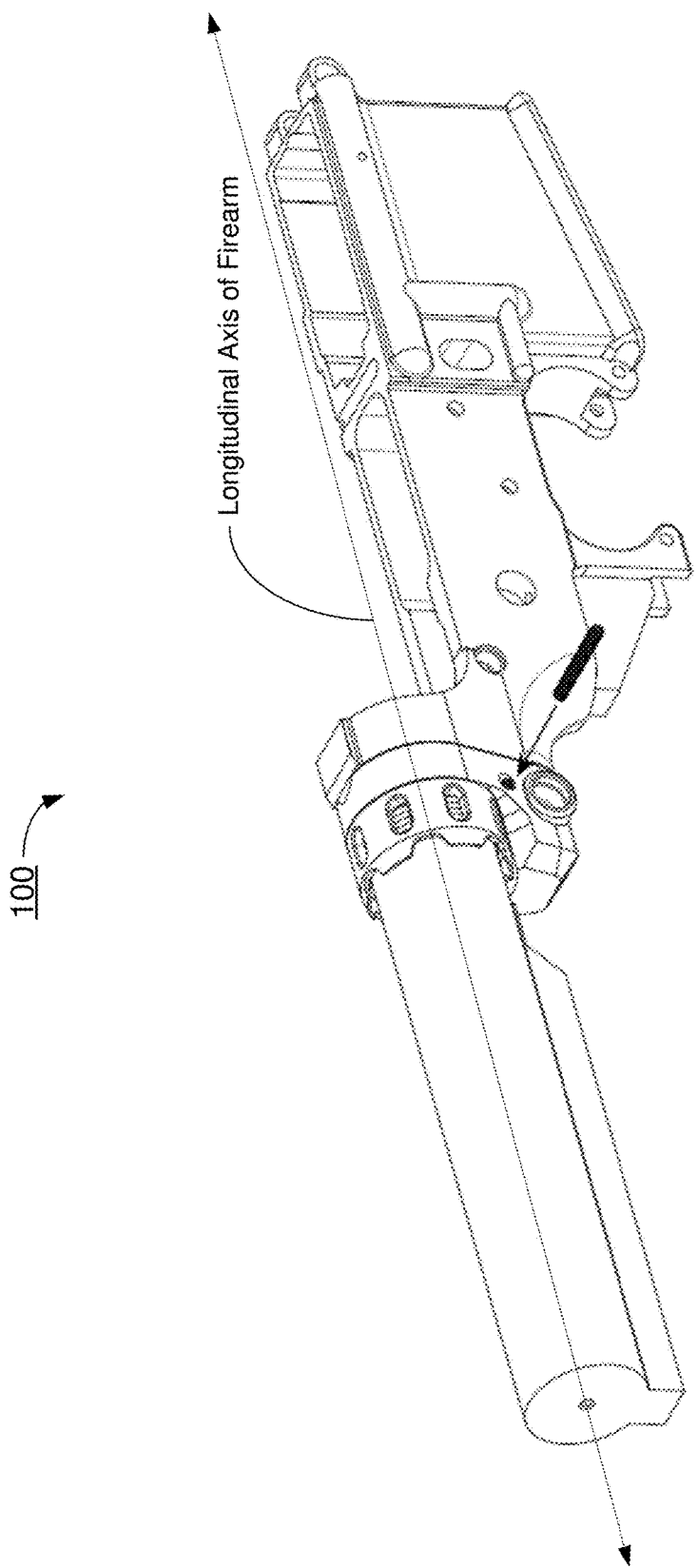
FIG. 3 is a diagram of a third step of an assembly process of an anti-loose castle nut and a receiver end plate to a lower receiver of a firearm in accordance with an implementation of the present disclosure.

FIG. 3 illustrates a third step of the assembly process in accordance with an implementation of the present disclosure. In the third step of assembly process (denoted as "Step 3" in FIG. 3), after castle nut 110 is screwed tightly against receiver end plate 120 and lower receiver 150, securing device 130 is received in through hole 125 of receiver end plate 120.

Figure 4:
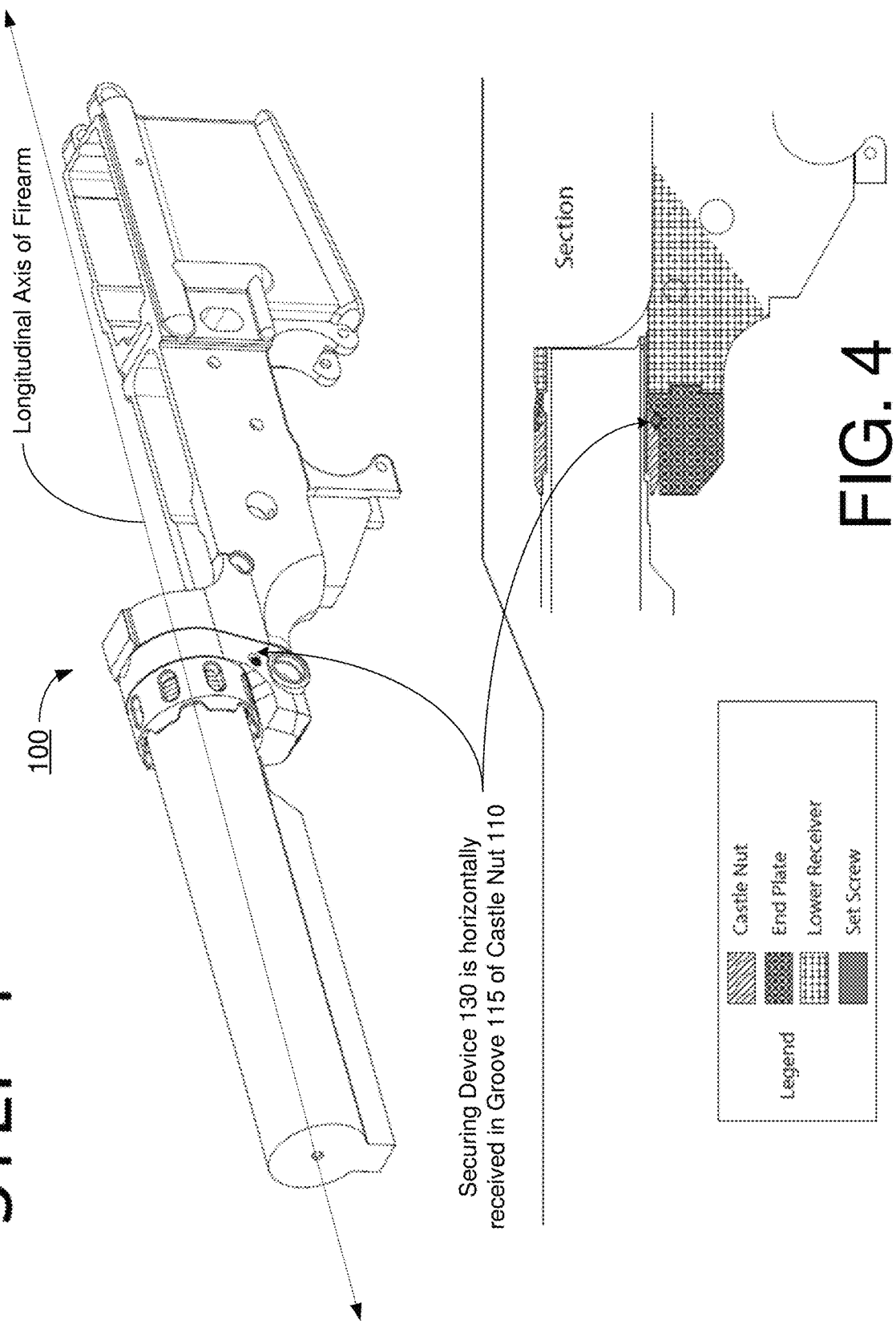
FIG. 4 is a diagram of a fourth step of an assembly process of an anti-loose castle nut and a receiver end plate to a lower receiver of a firearm in accordance with an implementation of the present disclosure.

FIG. 4 illustrates a fourth step of the assembly process in accordance with an implementation of the present disclosure. In the fourth step of assembly process (denoted as "Step 4" in FIG. 4), as securing device 130 is fully screwed into through hole 125, a portion of securing device 130 may be engaged with (e.g., horizontally received in) groove 115 of castle nut 110 so that castle nut 110 is prevented from being loosened (e.g., by being unscrewed in a direction away from lower receiver 150). That is, when receiver end plate 120 is fastened against lower receiver 150 by castle nut 110, groove 115 of castle nut 110 may be aligned with through hole 125 of receiver end plate 120.

Advantageously, the proposed design allows securing device 130 to be engaged with and received in groove 115 to interlock castle nut 110 and receiver end plate 120 on buffer tube 140 and lower receiver 150, thereby preventing castle nut 110 from coming loose (e.g., after a certain number of ammunition rounds have been fired through the firearm). Moreover, as the proposed design does not rely on staking to achieve anti-loose effect, there is no damage on receiver end plate 120 caused by castle nut 110. Furthermore, as the proposed design does not rely on staking, the process of assembly/disassembly can be repeated as receiver end plate 120 remains re-usable Highlight of Select Features In view of the above, select features of various implementations in accordance with the present disclosure are highlighted below.

In one aspect, an apparatus implementable on a firearm may include a castle nut, a receiver end plate, and a generally cylindrical-shaped securing device. The castle nut may have a groove around an exterior circumference of the castle nut. The receiver end plate may have a through hole extending in a direction perpendicular to a longitudinal axis and along a horizontal plane of the firearm. When a buffer tube is threaded onto a lower receiver of the firearm with the buffer tube traversing through the castle nut and the receiver end plate, the castle nut may be configured to be screwed in a direction toward the lower receiver to fasten the receiver end plate against the lower receiver. When the receiver end plate is fastened against the lower receiver by the castle nut, the securing device may be configured to be screwed into the through hole of the receiver end plate such that a portion of the securing device is horizontally received in the groove of the castle nut to prevent the castle nut to be loosened by being unscrewed in a direction away from the lower receiver.

In some embodiments, the securing device may include a set screw or pin screw. Moreover, the through hole may be a threaded through hole.

In some embodiments, the securing device may include a roll pin or dowel pin.

In some embodiments, the firearm may be an AK, AR-15 or AR-10 styled pistol, rifle, carbine or shotgun.

In some embodiments, the apparatus may further include the buffer tube.

In some embodiments, the apparatus may further include the lower receiver.

In some embodiments, the apparatus may further include the buffer tube and the lower receiver.

In one aspect, an apparatus implementable on a firearm may include a castle nut, a receiver end plate and a generally cylindrical-shaped securing device. The castle nut may have a groove around an exterior circumference of the castle nut. The receiver end plate may have a through hole extending in a direction perpendicular to a longitudinal axis and along a horizontal plane of the firearm. When a buffer tube is threaded onto a lower receiver of the firearm with the buffer tube traversing through the castle nut and the receiver end plate, the castle nut may be configured to be screwed in a direction toward the lower receiver to fasten the receiver end plate against the lower receiver. When the receiver end plate is fastened against the lower receiver by the castle nut, the groove of the castle nut may be aligned with the through hole of the receiver end plate. when the receiver end plate is fastened against the lower receiver by the castle nut, the securing device may be configured to be screwed into the through hole of the receiver end plate such that a portion of the securing device is horizontally received in the groove of the castle nut to prevent the castle nut to be loosened by being unscrewed in a direction away from the lower receiver.

In some embodiments, the firearm may be an AK, AR-15 or AR-10 styled pistol, rifle, carbine or shotgun.

In some embodiments, the apparatus may further include a securing device. In such cases, when the receiver end plate is fastened against the lower receiver by the castle nut, the securing device may be configured to be screwed into the through hole of the receiver end plate such that a portion of the securing device is engaged with the groove of the castle nut to prevent the castle nut to be loosened by being unscrewed in a direction away from the lower receiver.

In some embodiments, the securing device may include a set screw or pin screw. Moreover, the through hole may be a threaded through hole.

In some embodiments, the securing device may include a roll pin or dowel pin.

In some embodiments, the apparatus may further include the buffer tube.

In some embodiments, the apparatus may further include the lower receiver.

In some embodiments, the apparatus may further include the buffer tube and the lower receiver.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. An apparatus implementable on a firearm, comprising:
a castle nut having a groove around an exterior circumference of the castle nut;
wherein the castle nut is configured to thread onto a buffer tube;
a receiver end plate having a through hole extending in a direction perpendicular to a longitudinal axis and along a horizontal plane of the firearm; and
a generally cylindrical-shaped securing device,
wherein, when the receiver end plate is fastened against a lower receiver of the firearm by the castle nut, the securing device is configured to be received in the through hole of the receiver end plate such that a portion of the securing device is horizontally received in the groove of the castle nut to prevent the castle nut from being loosened by being unscrewed in a direction away from the lower receiver.

2. The apparatus of claim 1, wherein the securing device comprises a set screw or pin screw, and wherein the through hole comprises a threaded through hole.

3. The apparatus of claim 1, wherein the securing device comprises a roll pin or dowel pin.

4. The apparatus of claim 1, wherein the firearm comprises an AK, AR-15 or AR-10 styled pistol, rifle, carbine or shotgun.

5. The apparatus of claim 1, wherein, when the buffer tube of the firearm is threaded onto the lower receiver with the buffer tube traversing through the castle nut and the receiver end plate, the castle nut is configured to be screwed in a direction toward the lower receiver to fasten the receiver end plate against the lower receiver.

6. The apparatus of claim 5, further comprising:
the buffer tube.

7. The apparatus of claim 5, further comprising:
the lower receiver.

8. The apparatus of claim 5, further comprising:
the buffer tube; and
the lower receiver.

9. An apparatus implementable on a firearm, comprising:
a castle nut having a groove around an exterior circumference of the castle nut;
wherein the castle nut is configured to thread onto a buffer tube;
a receiver end plate having a through hole extending in a direction perpendicular to a longitudinal axis and along a horizontal plane of the firearm; and
a generally cylindrical-shaped securing device,
wherein, when the receiver end plate is fastened against a lower receiver of the firearm by the castle nut, the groove of the castle nut is aligned with the through hole of the receiver end plate, and
wherein, when the receiver end plate is fastened against the lower receiver by the castle nut, the securing device is configured to be screwed into the through hole of the receiver end plate such that a portion of the securing device is horizontally received in the groove of the castle nut to prevent the castle nut from being loosened by being unscrewed in a direction away from the lower receiver.

10. The apparatus of claim 9, wherein the firearm comprises an AK, AR-15 or AR-10 styled pistol, rifle, carbine or shotgun.

11. The apparatus of claim 9, wherein the securing device comprises a set screw or pin screw, and wherein the through hole comprises a threaded through hole.

12. The apparatus of claim 9, wherein the securing device comprises a roll pin or dowel pin.

13. The apparatus of claim 9, wherein, when the buffer tube of the firearm is threaded onto the lower receiver with the buffer tube traversing through the castle nut and the receiver end plate, the castle nut is configured to be screwed in a direction toward the lower receiver to fasten the receiver end plate against the lower receiver.

14. The apparatus of claim 13, further comprising:
the buffer tube.

15. The apparatus of claim 13, further comprising:
the lower receiver.

16. The apparatus of claim 13, further comprising:
the buffer tube; and
the lower receiver.

17. An apparatus implementable on a firearm, comprising:
a lower receiver;
a castle nut having a groove around an exterior circumference of the castle nut;
wherein the castle nut is configured to thread onto a buffer tube;
a receiver end plate having a through hole extending in a direction perpendicular to a longitudinal axis and along a horizontal plane of the firearm; and
a generally cylindrical-shaped securing device,
wherein, when the receiver end plate is fastened against the lower receiver by the castle nut, the groove of the castle nut is aligned with the through hole of the receiver end plate, and
wherein, when the receiver end plate is fastened against the lower receiver by the castle nut, the securing device is configured to be screwed into the through hole of the receiver end plate such that a portion of the securing device is horizontally received in the groove of the castle nut to prevent the castle nut from being loosened by being unscrewed in a direction away from the lower receiver.

18. The apparatus of claim 17, further comprising:
the buffer tube.

* * * * *